United States Patent
Kim et al.

(10) Patent No.: US 12,087,950 B2
(45) Date of Patent: Sep. 10, 2024

(54) GAS DIFFUSION LAYER FOR METAL-AIR BATTERY, METHOD OF MANUFACTURING THE SAME, AND METAL-AIR BATTERY INCLUDING THE SAME

(71) Applicant: Samsung Electronics Co., Ltd., Suwon-si (KR)

(72) Inventors: Mokwon Kim, Suwon-si (KR); Joonhee Kim, Seoul (KR); Jungock Park, Yongin-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 172 days.

(21) Appl. No.: 17/366,407

(22) Filed: Jul. 2, 2021

(65) Prior Publication Data
US 2021/0336277 A1    Oct. 28, 2021

Related U.S. Application Data

(63) Continuation of application No. 15/979,567, filed on May 15, 2018, now abandoned.

(30) Foreign Application Priority Data

May 15, 2017  (KR) .................. 10-2017-0059912
May 11, 2018  (KR) .................. 10-2018-0054576

(51) Int. Cl.
*H01M 4/88*    (2006.01)
*H01M 4/66*    (2006.01)
(Continued)

(52) U.S. Cl.
CPC ......... *H01M 4/8807* (2013.01); *H01M 4/665* (2013.01); *H01M 4/666* (2013.01);
(Continued)

(58) Field of Classification Search
None
See application file for complete search history.

(56) References Cited

U.S. PATENT DOCUMENTS 5,093,880 A * 3/1992 Matsuda .................. C25D 3/38
                                                    385/100
6,551,701 B1 * 4/2003 Nohr ..................... B41M 5/5227
                                                    106/287.18
(Continued)

FOREIGN PATENT DOCUMENTS

CN    105261762 A     1/2016
DE    102011080936    2/2013
(Continued)

OTHER PUBLICATIONS

Japanese Office Action for Japanese Patent Application No. 2018-093771 dated Feb. 21, 2022.
(Continued)

*Primary Examiner* — Zhongqing Wei
(74) *Attorney, Agent, or Firm* — CANTOR COLBURN LLP

(57) ABSTRACT

A gas diffusion layer for a metal-air battery, the gas diffusion layer including: a porous layer including non-conductive fiber structures, a conductive carbon layer including a carbon material that is disposed on a surface of a non-conductive fiber structure of the plurality of non-conductive fiber structures.

22 Claims, 11 Drawing Sheets

(51) Int. Cl.
*H01M 4/86* (2006.01)
*H01M 12/02* (2006.01)
*H01M 12/08* (2006.01)
*H01M 50/417* (2021.01)
*H01M 4/134* (2010.01)
*H01M 4/38* (2006.01)
*H01M 50/403* (2021.01)
*H01M 50/44* (2021.01)

(52) U.S. Cl.
CPC ......... *H01M 4/667* (2013.01); *H01M 4/8615* (2013.01); *H01M 4/8626* (2013.01); *H01M 4/8817* (2013.01); *H01M 12/02* (2013.01); *H01M 12/08* (2013.01); *H01M 50/417* (2021.01); *H01M 4/134* (2013.01); *H01M 4/382* (2013.01); *H01M 4/663* (2013.01); *H01M 4/8673* (2013.01); *H01M 2004/8689* (2013.01); *H01M 50/403* (2021.01); *H01M 50/44* (2021.01)

(56) References Cited

U.S. PATENT DOCUMENTS

| | | | |
|---|---|---|---|
| 7,282,295 | B2 | 10/2007 | Visco et al. |
| 8,129,052 | B2 | 3/2012 | Visco et al. |
| 8,501,339 | B2 | 8/2013 | Visco et al. |
| 8,691,444 | B2 | 4/2014 | Visco et al. |
| 8,778,522 | B2 | 7/2014 | Visco et al. |
| 8,828,580 | B2 | 9/2014 | Visco et al. |
| 8,932,771 | B2 | 1/2015 | Visco et al. |
| 2008/0280031 | A1* | 11/2008 | Drzal ................ C08J 5/04 427/78 |
| 2009/0075133 | A1 | 3/2009 | Song et al. |
| 2010/0098991 | A1 | 4/2010 | Suzuki et al. |
| 2011/0027664 | A1 | 2/2011 | Burchardt et al. |
| 2011/0143262 | A1* | 6/2011 | Fultz ................ H01M 8/1007 429/513 |
| 2011/0305974 | A1 | 12/2011 | Nakanishi |
| 2012/0045710 | A1 | 2/2012 | Jeschke et al. |
| 2012/0208096 | A1 | 8/2012 | Kuboki et al. |
| 2013/0040210 | A1 | 2/2013 | Mizuno et al. |
| 2013/0202974 | A1 | 8/2013 | Mizuno |
| 2013/0224609 | A1 | 8/2013 | Lee et al. |
| 2014/0162108 | A1 | 6/2014 | Visco et al. |
| 2014/0377669 | A1 | 12/2014 | Schumann et al. |
| 2015/0079485 | A1 | 3/2015 | Choi et al. |
| 2015/0093660 | A1 | 4/2015 | Barde |
| 2015/0140452 | A1 | 5/2015 | Park et al. |
| 2015/0204009 | A1 | 7/2015 | Kim et al. |
| 2016/0020469 | A1 | 1/2016 | Kotani et al. |
| 2017/0033422 | A1 | 2/2017 | Kim et al. |
| 2019/0067767 | A1 | 2/2019 | Park et al. |

FOREIGN PATENT DOCUMENTS

| | | |
|---|---|---|
| DE | 102014209209 | 11/2015 |
| DE | 102014209209 A1 | 11/2015 |
| EP | 2131433 | 5/2008 |
| JP | 2012155862 A | 8/2012 |
| JP | 5193478 B2 | 2/2013 |
| JP | 2013037999 A | 2/2013 |
| JP | 2013191435 A | 9/2013 |
| JP | 2014197477 A | 10/2014 |
| JP | 2014216232 A | 11/2014 |
| JP | 2017050186 A | 3/2017 |
| KR | 1020090030027 A | 3/2009 |
| KR | 1020150058616 A | 5/2015 |
| WO | 2014069853 A1 | 5/2014 |
| WO | 2015179541 | 11/2015 |

OTHER PUBLICATIONS

Chinese Office Action for Chinese Patent Application No. 201810462386.6 dated Aug. 19, 2022.
European Search Report for European Patent Application No. 18172176.2 dated Aug. 2, 2018.
Korean Office Action for Korean Patent Application No. 10-2018-0054576 dated Feb. 20, 2023.

* cited by examiner

GAS DIFFUSION LAYER FOR METAL-AIR BATTERY, METHOD OF MANUFACTURING THE SAME, AND METAL-AIR BATTERY INCLUDING THE SAME

CROSS-REFERENCE TO RELATED APPLICATION

This application claims priority to and the benefit of Korean Patent Application No. 10-2017-0059912, filed on May 15, 2017, and Korean Patent Application No. 10-2018-0054576, filed on May 11, 2018, in the Korean Intellectual Property Office, and all the benefits therefrom under 35 U.S.C. § 119, the contents of which are incorporated herein in their entirety by reference.

BACKGROUND

1. Field

The present disclosure relates to a gas diffusion layer for a metal-air battery, a method of manufacturing the gas diffusion layer, and a metal-air battery including the gas diffusion layer.

2. Description of the Related Art

A metal-air battery includes a negative electrode capable of intercalation/deintercalation of ions, and a positive electrode using oxygen in the air as an active material. The positive electrode oxidizes/reduces oxygen from the outside of the metal-air battery. The negative electrode oxidizes/reduces metal and converts chemical energy generated during the oxidation and reduction of the metal into electrical energy, thus discharging the electrical energy. For example, the metal-air battery absorbs oxygen while discharging, and discharges the absorbed oxygen while charging. Such a metal-air battery uses oxygen in the air, and thus an energy density thereof may be greatly improved. For example, the energy density of the metal-air battery may be several times higher than that of a lithium ion battery. Nonetheless, there remains a need for improved materials to provide improved energy density.

SUMMARY

Additional aspects will be set forth in part in the description which follows and, in part, will be apparent from the description, or may be learned by practice of the presented embodiments.

According to an aspect of an embodiment, a gas diffusion layer for a metal-air battery includes: a porous layer including a plurality of non-conductive fiber structures; and a conductive carbon layer including a carbon material that is disposed on a surface of a non-conducive fiber structure of the plurality of non-conductive fiber structures.

The non-conductive fiber structures may each independently have a curvilinear, e.g., wavy, shape or a rectilinear, e.g., straight-line, shape, and air gaps may be provided between the non-conductive fiber structures where an intervening material is not present.

Each of the plurality of non-conductive fiber structures may include a polymeric resin fiber, cellulose, a glass fiber, or a combination thereof, and the porous layer may be in a form of a woven fabric, a non-woven fabric, a mesh, or a combination thereof comprising the plurality of non-conductive fiber structures.

The carbon material may include a carbon fiber, a carbon nanotube (CNT), a graphene nano plate (GNP), or a combination thereof.

A thickness of the conductive carbon layer may be equal to or greater than about 1% and less than or equal to about 10% of an average thickness of a non-conductive fiber structure of the plurality of non-conductive fiber structures.

The carbon material included in the conductive carbon layer may be uniformly disposed on the surface of the plurality of non-conductive fiber structures.

The conductive carbon layer may further include a dispersant configured to disperse the carbon material.

The dispersant may be a polymeric surfactant.

The polymeric surfactant may include polystyrene sulfonate (PSS), poly(4-styrenesulfonic acid), polyvinyl pyrrolidone (PVP), polyethylene glycol oleyl ether (Brij®), polyoxyethylene stearyl ether (Brij®), polyoxyethylene nonylphenyl ether (IGEPAL®), poly(ethylene glycol)-block-poly(propylene glycol)-block-poly(ethylene glycol), Pluronic®), poly(propylene glycol)-block-poly(ethylene glycol)-block-poly(propylene glycol), polyethylene-block-poly(ethylene glycol), polyoxyethylene isooctylcyclohexyl ether, Triton®, or a combination thereof.

The dispersant may be an organic monomolecular dispersant. The organic monomolecular dispersant may include cetylpyridinium chloride (CPC), cetyltrimethylammonium bromide (CTAB), cetyltrimethylammonium chloride (CTAC), or a combination thereof.

The gas diffusion layer may further include an adhesive layer disposed between non-conductive fiber structures of the plurality of non-conductive fiber structures and the conductive carbon layer, wherein the adhesive layer attaches the conductive carbon layer to the surface of the non-conductive fiber structure.

The adhesive layer may include polyvinyl alcohol (PVA), PVP, polyaniline (PANI), poly(diallyldimethylammonium chloride) (PDDA), poly(ethylene oxide) (PEO), poly(ethylene imine) (PEI), poly(allylamine hydrochloride) (PAH), poly(acrylic acid), Nafion®, or a combination thereof.

A plurality of adhesive layers and a plurality of conductive carbon layers may be present, and the plurality of adhesive layers and the plurality of conductive carbon layers may be alternately arranged.

According to an aspect of another embodiment, a method of manufacturing a gas diffusion layer for a metal-air battery includes: disposing an adhesive layer on a surface of a non-conductive fiber structure; and contacting the adhesive layer with a carbon material to form a conductive carbon layer including the carbon material on the non-conductive fiber structure to manufacture the gas diffusion layer.

The method may further include uniformly dispersing the carbon material by using a dispersant.

The dispersant may be a polymeric surfactant.

The polymeric surfactant may include polystyrene sulfonate (PSS), poly(4-styrenesulfonic acid), polyvinyl pyrrolidone (PVP), polyethylene glycol oleyl ether (Brij®), polyoxyethylene stearyl ether (Brij®), polyoxyethylene nonylphenyl ether (IGEPAL®), poly(ethylene glycol)-block-poly(propylene glycol)-block-poly(ethylene glycol) (Pluronic®), poly(propylene glycol)-block-poly(ethylene glycol)-block-poly(propylene glycol), polyethylene-block-poly(ethylene glycol), polyoxyethylene isooctylcyclohexyl ether, Triton®, or a combination thereof.

The dispersant may be an organic monomolecular dispersant. The organic monomolecular dispersant may include cetylpyridinium chloride (CPC), cetyltrimethylammonium bromide (CTAB), cetyltrimethylammonium chloride (CTAC), or a combination thereof.

The dispersant may include polystyrene sulfonate (PSS), poly(4-styrenesulfonic acid), PVP, polyethylene glycol oleyl ether, polyoxyethylene stearyl ether, polyoxyethylene nonylphenyl ether, poly(ethylene glycol)-block-poly(propylene glycol)-block-poly(ethylene glycol), Pluronic®), poly(propylene glycol)-block-poly(ethylene glycol)-block-poly(propylene glycol), polyethylene-block-poly(ethylene glycol), polyoxyethylene isooctylcyclohexyl ether, cetylpyridinium chloride (CPC), cetyltrimethylammonium bromide (CTAB), cetyltrimethylammonium chloride (CTAC), or a combination thereof.

The disposing of the adhesive layer and the contacting of the adhesive layer with a carbon material to form the conductive carbon layer may be repeatedly performed, and thus a plurality of adhesive layers and a plurality of conductive carbon layers may be alternately arranged.

According to an aspect of an embodiment, a metal-air battery includes: a negative electrode including a metal; a positive electrode including a positive electrode layer including a catalyst and a gas diffusion layer for the metal-air battery, wherein the gas diffusion layer contacts the positive electrode electrolyte layer; and an electrolyte between the negative electrode and the positive electrode, wherein the gas diffusion layer includes: a porous layer including a plurality of non-conductive fiber structures; and a conductive carbon layer including a carbon material that is disposed on a surface of a non-conductive fiber structurer of the plurality of non-conductive fiber structures.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
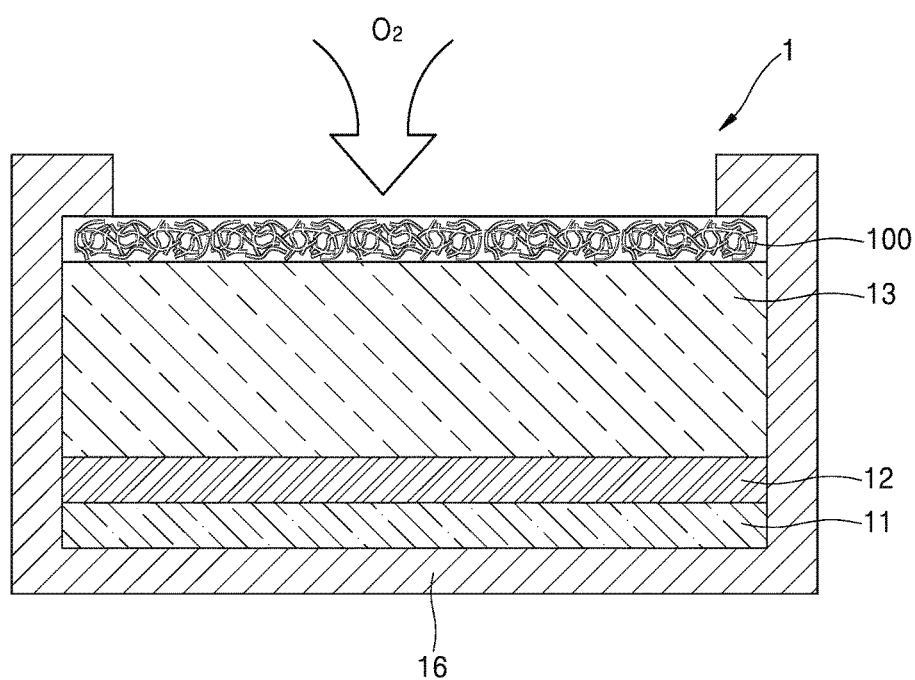
FIG. 1A is a schematic cross-sectional view of an embodiment of a metal-air battery having a two-dimensional (2D) flat-cell shape.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of" when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When the weight of a gas diffusion layer included in a metal-air battery is reduced, the energy density of the metal-air battery may be improved. In this regard, a porous film including a carbon nanomaterial is used as a gas diffusion layer, but mechanical characteristics of currently available materials are insufficient.

The terms "surface" and "other surface" denote two surfaces opposite to each other, and the terms "direction" and "other direction" denote two directions opposite to each other.

The term "air" as used herein denotes atmospheric air, a combination of gases including oxygen, oxygen gas, or a combination thereof.

An improved gas diffusion layer for a metal-air battery, a method of manufacturing the gas diffusion layer, and the metal-air battery including the gas diffusion layer will now be described more fully with reference to the accompanying drawings.

Figure 1B:
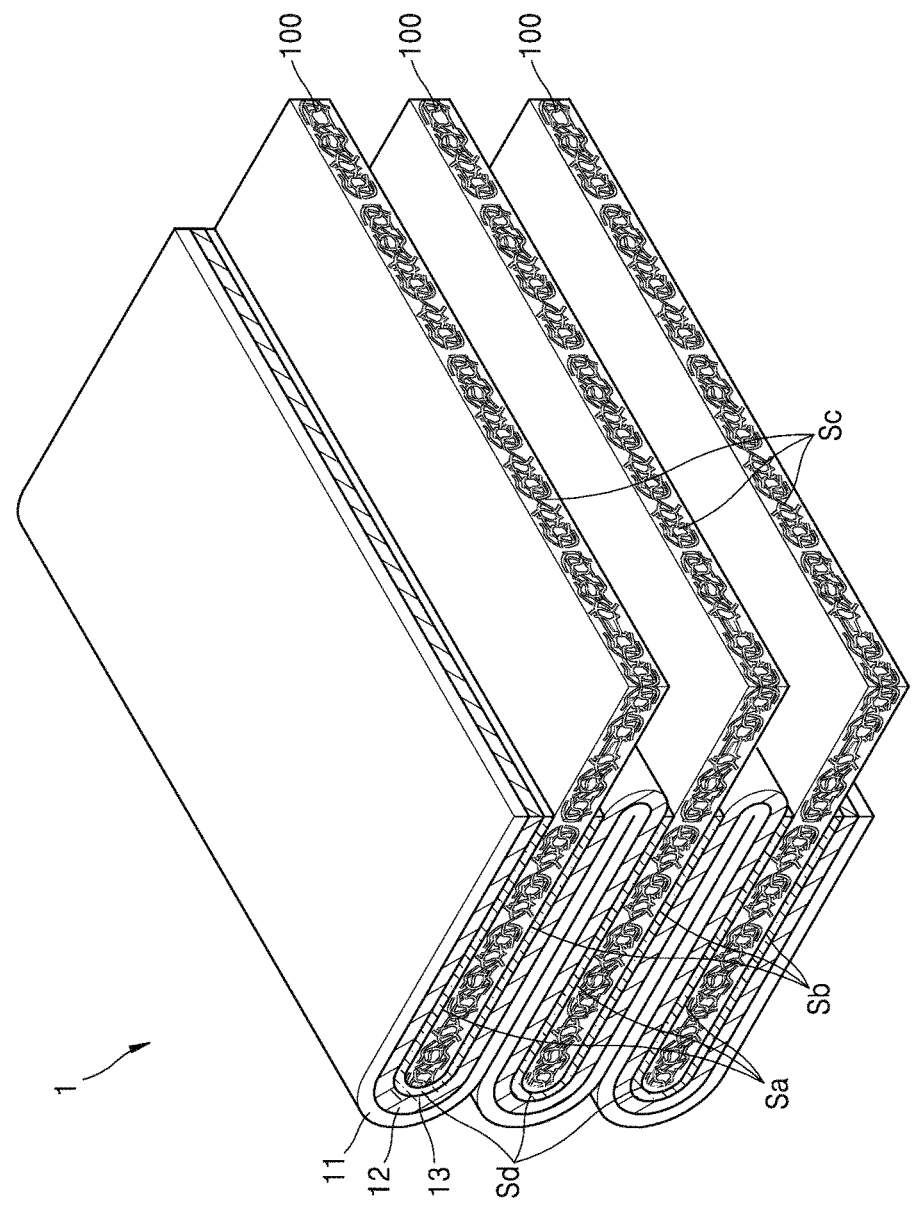
FIG. 1B is a schematic perspective view of an embodiment of a metal-air battery having a 3D shape.

FIG. 1A is a schematic cross-sectional view of an embodiment of a metal-air battery 1 having a two-dimensional (2D) flat-cell shape. FIG. 1B is a schematic perspective view of an embodiment of the metal-air battery 1 having a three-dimensional (3D), e.g., prismatic, shape.

Referring to FIG. 1A, the metal-air battery 1 having the 2D flat-cell shape may include, for example, a negative electrode metal layer 11, a negative electrode electrolyte membrane 12, a positive electrode layer 13, a gas diffusion layer 100 for a metal-air battery (hereinafter, referred to as the 'gas diffusion layer'), and an exterior material 16 surrounding portions of the metal-air battery 1 other than a top surface of the gas diffusion layer 100.

For example, the negative electrode metal layer 11 may include lithium (Li) metal capable of intercalation/deintercalation of Li ions and a binder. For example, the negative electrode metal layer 11 may further include a Li metal-based alloy, a Li intercalation compound, or a combination thereof, in addition to the Li metal. The negative electrode electrolyte membrane 12 may be between the negative electrode metal layer 11 and the positive electrode layer 13 and may include an electrolyte for delivering Li ions generated in the negative electrode metal layer 11 to the positive electrode layer 13. The positive electrode layer 13 may include an electrolyte conductive to Li ions, a catalyst for oxidation and reduction of oxygen, a conductive material, and a binder. The gas diffusion layer 100 may absorb oxygen in the air and provide the absorbed oxygen to the positive electrode layer 13. To this end, the gas diffusion layer 100 may have a porous structure to smoothly diffuse external oxygen.

In the case of the metal-air battery 1 having the 2D flat-cell shape, when multiple cells are vertically stacked, oxygen may not be provided adequately to cells at the bottom of the metal-air battery 1. Also, since a weight of a collector (not shown) for discharging a current is a large portion of the total weight of the metal-air battery 1, a ratio of weights of the negative electrode metal layer 11, the negative electrode electrolyte membrane 12, and the positive electrode layer 13 to the total weight of the metal-air battery 1 may be small, wherein the weights affect energy density.

Referring to FIG. 1B, the metal-air battery 1 having the 3D shape may include the positive electrode layer 13, the negative electrode electrolyte membrane 12, the negative electrode metal layer 11, and the gas diffusion layers 100.

The gas diffusion layer 100 according to an embodiment may include a first surface Sa, a second surface Sb facing the first surface Sa, and a side surface Sc that may be exposed to the outside.

The positive electrode layer 13, the negative electrode electrolyte membrane 12, and the negative electrode metal layer 11 may be folded at least once so that the positive electrode layer 13 may be in contact with the first surface Sa and the second surface Sb of the gas diffusion layer 100. The gas diffusion layer 100 may be inserted into the folded positive electrode layer 13. For example, if the positive electrode layer 13, the negative electrode electrolyte membrane 12, and the negative electrode metal layer 11 are folded at least twice, the positive electrode layer 13, the negative electrode electrolyte membrane 12, and the negative electrode metal layer 11 may be alternately folded in one direction, and then folded in another direction, as shown in FIG. 1B.

The positive electrode layer 13, the negative electrode electrolyte membrane 12, and the negative electrode metal layer 11 may be respectively folded to have a constant width in a thickness direction. Throughout the specification, a "width" and "length" of a certain component may be distinguished by a size thereof, and the "width" is equal or smaller than a "length."

As is further described above, in a structure in which the positive electrode layer 13 is disposed on the first surface Sa and the second surface Sb of the gas diffusion layer 100, the first surface Sa and the second surface Sb of the gas diffusion layer 100 are not exposed to the outside. Accordingly, air may be supplied to the gas diffusion layer 100 through side surfaces or some of the side surfaces of the gas diffusion layer 100. That is, air may be supplied to the gas diffusion layer 100 through at least one side surface Sc from among the side surfaces of the gas diffusion layer 100.

The metal-air battery 1 may have a structure that may facilitate supply of air through side surfaces of the gas diffusion layer 100 which are exposed to the outside. Also, although not illustrated in the drawings, an exterior material (not shown) may surround remaining external surfaces of the negative electrode metal layer 11, the negative electrode electrolyte membrane 12, the positive electrode layer 13, and the gas diffusion layer 100 except for the exposed side surface Sc of the gas diffusion layer 100.

As is further described above, the gas diffusion layer 100 has suitable electrically conductive and has suitable gas diffusivity and also provides suitably uniform mechanical strength. According to the related art, a porous film including carbon nanomaterials having excellent electrical conductivity is used as the gas diffusion layer 100. However, when a 3D porous structure is formed to provide improved porosity, resistance of a structure increases and mechanical strength decreases.

In the present specification, the gas diffusion layer 100, which includes a porous layer 110 (see FIG. 2B) including a non-conductive fiber structure 111 (see FIG. 2B) and a conductive carbon layer 120 disposed on a surface of the non-conductive fiber structure 111, for example, a conformal layer along a contour of the non-conductive fiber structure 111, which is included in the porous layer 110, is used, and the metal-air battery 1 has improved electrical conductivity, improved gas diffusivity, uniform mechanical strength, and reduced weight. Hereinafter, the gas diffusion layer 110 according to an embodiment will be described in more detail.

Figure 2A:
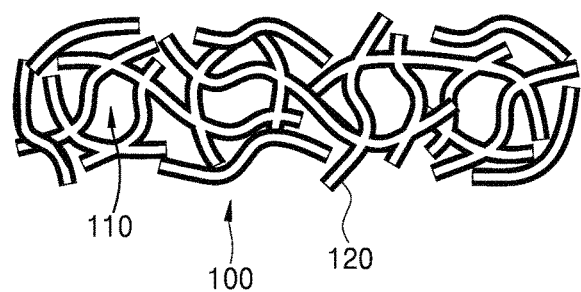
FIG. 2A is a schematic perspective view of a gas diffusion layer according to an embodiment.
Figure 2B:
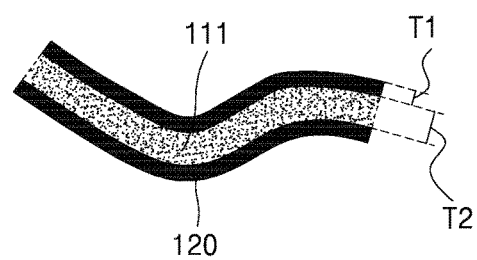
FIG. 2B shows a schematic enlarged view of the gas diffusion layer of FIG. 2A.
Figure 2C:
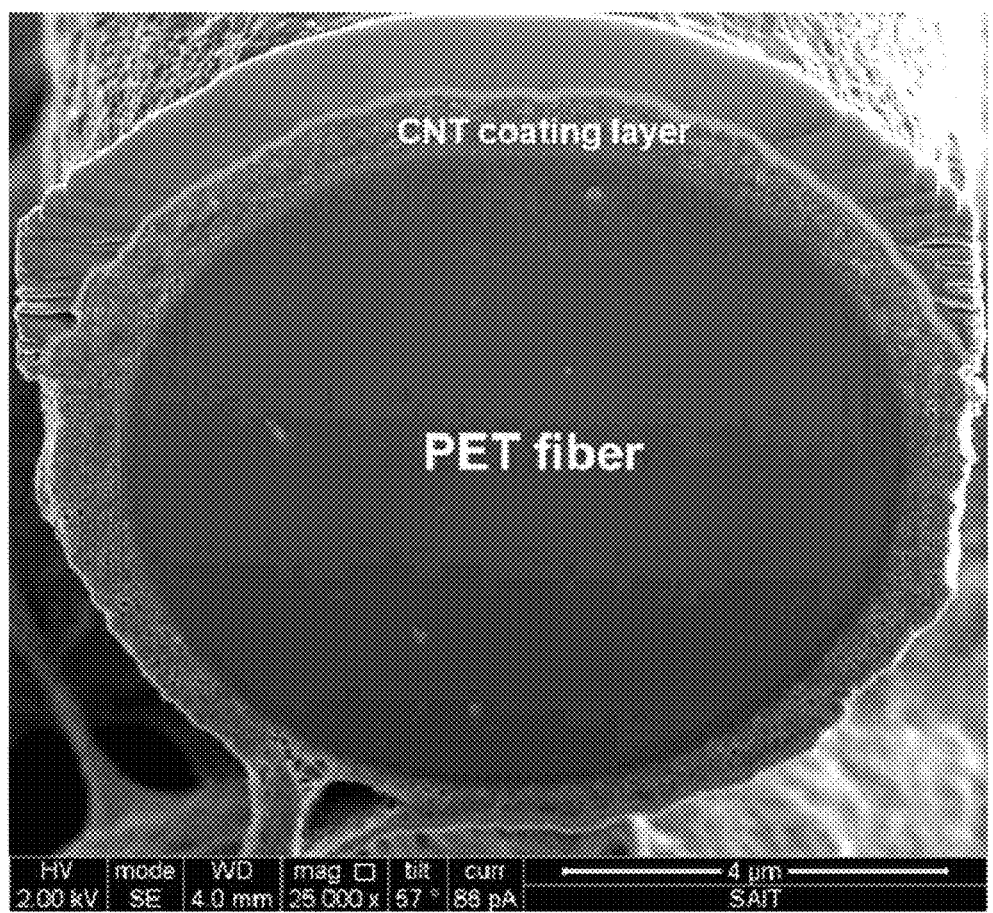
FIG. 2C is a scanning electron microscope (SEM) image showing a cross-section of a fiber structure to which a conductive carbon layer is attached, the conductive carbon layer being manufactured by a layer-by-layer method.
Figure 2D:
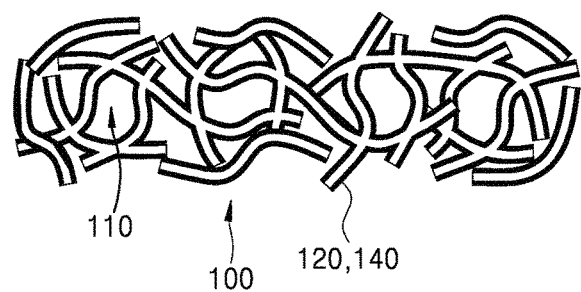
FIG. 2D is a schematic perspective view of a gas diffusion layer according to another embodiment.
Figure 2E:
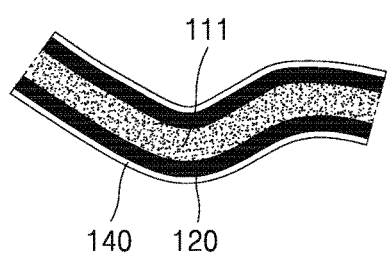
FIG. 2E shows a schematic enlarged view of the gas diffusion layer of FIG. 2D.
Figure 2F:
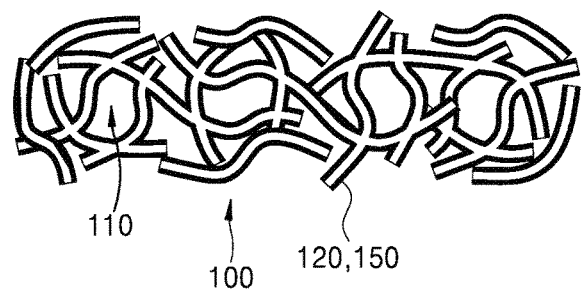
FIG. 2F is a schematic perspective view of a gas diffusion layer according to another embodiment.
Figure 2G:
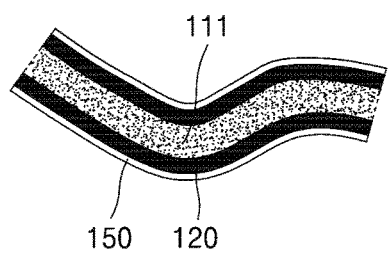
FIG. 2G shows a schematic enlarged view of the gas diffusion layer of FIG. 2F.

FIG. 2A is a schematic perspective view of a gas diffusion layer according to an embodiment. FIG. 2B shows a schematic enlarged view of the gas diffusion layer of FIG. 2A. FIG. 2C is a scanning electron microscope (SEM) image showing a cross-section of a fiber structure to which a conductive carbon layer is attached, the conductive carbon layer being manufactured by a layer-by-layer method. FIG. 2D is a schematic perspective view of a gas diffusion layer according to another embodiment. FIG. 2E shows a schematic enlarged view of the gas diffusion layer of FIG. 2D. FIG. 2F is a schematic perspective view of a gas diffusion layer according to another embodiment. FIG. 2G shows a schematic enlarged view of the gas diffusion layer of FIG. 2F.

FIG. 2A schematically illustrates the gas diffusion layer 100 according to an embodiment, FIG. 2B shows an enlarged view of a portion of FIG. 2A, and FIG. 2C is a scanning electron microscope (SEM) image showing a cross-section of the non-conductive fiber structure 111 to which the conductive carbon layer 120 is attached, the conductive carbon layer 120 being manufactured by using a layer-by-layer method.

Referring to FIGS. 2A, 2B, and 2C, the gas diffusion layer 100 according to an embodiment may include the porous layer 110 having pores, through which air may diffuse, and the conductive carbon layer 120 attached to the surfaces of the non-conductive fiber structure 111 included in the porous layer 110.

The porous layer 110 according to an embodiment may include the non-conductive fiber structure 111. For example, the non-conductive fiber structure 111 may have a curvilinear, e.g., wavy, shape, or a rectilinear, e.g., straight-line, shape, or a combination thereof. The shape of a plurality of the fiber structures provides air gaps, which may be formed in the absence of intervening materials between the non-conductive fiber structures 111 of the plurality of the fiber structures, and pores through which air may diffuse may be provided by the air gaps. Thus the porous layer 110 comprises air gaps defined by the non-conductive fiber structures 111. In addition, the porous layer 110 may be formed as the non-conductive fiber structure 111 are combined with each other in a form of a woven fabric, a non-woven fabric, a mesh, or a combination thereof. The non-conductive fiber structure 111 may be insulating, and accordingly, the porous layer 110 may also be electrically insulating.

For example, the non-conductive fiber structure 111 may comprise a polymer fiber, cellulose, a glass fiber, or combination thereof. For example, the non-conductive fiber structure 111 may comprise a polymer comprising a homopolymer, a block copolymer, a random copolymer, or a combination thereof. For example, the non-conductive fiber structure 111 may comprise polyethylene, polypropylene, a polyester such as polyethylene terephthalate, polyphenylene sulfide, poly(2-vinylpyridine), polytetrafluoroethylene, a tetrafluoroethylene-hexafluoropropylene copolymer, polychlorotrifluoroethylene, a perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, poly(C1 to C6 alkyl)diol diacrylate, poly(C1 to C6 alkyl)diol dimethacrylate, polydivinylbenzene, polyether, polycarbonate, polyamide, polyvinyl chloride, polyimide, polycarboxylic acid, polysulfonic acid, polyvinyl alcohol, polysulfone, polystyrene, poly(p-phenylene), polyacetylene, poly(p-phenylene vinylene), polyaniline, polypyrrole, polythiophene, poly (2,5-ethylene vinylene), polyacene, poly(naphthalene-2,6-diyl), polyethylene oxide, polypropylene oxide, polyvinylidene fluoride (PVDF), a copolymer of vinylidene fluoride and hexafluoropropylene (VDF/HFP), poly(vinyl acetate), poly(vinyl butyral-co-vinyl alcohol-co-vinyl acetate), poly(methyl methacrylate-co-ethyl acrylate), polyacrylonitrile (PAN), polyvinyl chloride co-vinyl acetate, poly(1-vinyl pyrrolidone-co-vinyl acetate), polyvinyl pyrrolidone, poly(C1 to C6 alkyl) acrylate, poly (C1 to C6 alkyl) methacrylate, polyurethane, polyvinyl ether, acrylonitrile-butadiene rubber, styrene-butadiene rubber, acrylonitrile-butadiene-styrene rubber, sulfonated styrene/ethylene-butylene triblock copolymer, a polymer obtained from a (meth)acrylate monomer comprising ethoxylated neopentyl glycol diacrylate, ethoxylated bisphenol A diacrylate, ethoxylated aliphatic urethane acrylate, ethoxylated alkylphenol acrylate and a (C1 to C6alkyl) acrylate, or a combination thereof, epoxy resin, acrylic resin, or a combination thereof. A combination comprising at least one of the forgoing may be used.

For example, a non-woven fabric included in the porous layer 110 may be formed, for example, by filtering primary, e.g., individual, material fibers and binder fibers, which are dispersed in water, in a form of a circular mesh, an elongated mesh, or the like by using a paper machine, and then by drying filtrate by using a drier. In addition, in order to remove fluff, e.g., unbonded fibers, from the non-woven fabric or improve mechanical characteristics of the non-woven fabric, the non-woven fabric may be sandwiched between two rolls and then may be heat-treated at a high pressure.

The conductive carbon layer 120 according to an embodiment may include any suitable carbon material having suitable conductivity. For example, the conductive carbon layer 120 may include a carbon material comprising a carbon fiber, a carbon nanotube (CNT), a graphene nano plate (GNP), or a carbon-polymer complex. For example, the carbon-polymer complex may be a complex including the carbon fiber, CNT, or the GNP combined with the binder. For example, the binder may be one or more of a copolymer of VDF/HFP, PVDF, PAN, poly(methyl methacrylate) (PMMA), polytetrafluoroethylene (PTEE), a copolymer of polyacrylonitrile-acrylic acid (PAN/PAA), polyvinyl alcohol (PVA), carboxymethyl cellulose (CMC), and hydroxypropylcellulose. However, the present disclosure is not limited thereto. The conductive carbon layer 120 may include any suitable carbon material having suitable conductivity.

Also, the carbon material included in the conductive carbon layer 120 according to an embodiment may be disposed along a surface of the non-conductive fiber structure 111 included in the porous layer 110. Thus, the conductive carbon layer 120 may be disposed to surround the surface of the non-conductive fiber structure 111. For example, the carbon material included in the conductive carbon layer 120 may be uniformly dispersed due to an added dispersant or a sonication process. Accordingly, the carbon material included in the conductive carbon layer 120 may be uniformly disposed along the surface of the non-conductive fiber structure 111.

For example, a polymeric surfactant may be used as a dispersant. For example, the polymeric surfactant may comprise polystyrene sulfonate (PSS), poly(4-styrenesulfonic acid, polyvinyl pyrrolidone (PVP), polyethylene glycol oleyl ether (e.g., Brij®, which is a commercially available polyethylene glycol oleyl ether product of Croda International PLC), polyoxyethylene stearyl ether (Brij®), polyoxyethylene nonylphenyl ether (commercially available as IGEPAL®, which is a product of Rhodia Operations), poly (ethylene glycol)-block-poly(propylene glycol)-block-poly (ethylene glycol), Pluronic®, which is a commercially available poly(ethylene glycol)-block-poly(propylene glycol)-block-poly(ethylene glycol) product of BASF, poly (propylene glycol)-block-poly(ethylene glycol)-block-poly (propylene glycol), polyethylene-block-poly(ethylene glycol), polyoxyethylene isooctylcyclohexyl ether, or Triton®, which is an octyl phenol ethoxylate product of Dow. Also, the dispersant may be an organic monomolecular dispersant. For example, the organic monomolecular dispersant may comprise cetylpyridinium chloride (CPC), cetyltrimethylammonium bromide (CTAB), cetyltrimethylammonium chloride (CTAC), or a combination thereof. A combination comprising at least two of the foregoing may be used.

In addition, the sonication process may be performed for several minutes to several hours by using, for example, a bar-type sonicator. Also, the dispersant may be used while the sonication process is being performed. Thus, a dispersion in which graphene-based carbon materials are dispersed may be prepared, and the gas diffusion layer 100 in which the carbon material is uniformly disposed along the surfaces of the non-conductive fiber structure 111 may be manufactured by using the dispersion.

As is further described above, when the conductive carbon layer 120 is disposed to surround the surface of the non-conductive fiber structure 111, a thickness of the conductive carbon layer 120 may be equal or greater than about 1% and less than or equal to about 10%, or about 1.5% to about 8%, or about 2% to about 7% of a total thickness of the non-conductive fiber structure 111. For example, when a cross-section of the non-conductive fiber structure 111 is oval, a diameter of the cross-section may be in a range from about 7 μm to about 10 μm. For example, when a diameter T1 of the cross-section of the non-conductive fiber structure 111 is about 10 μm, a thickness T2 of the conductive carbon layer 120 may be in a range from about 100 nm to about 1 μm.

In addition, according to an embodiment, a thickness of the gas diffusion layer 100 may be less than about 50 μm, for example, from about 10 μm to about 50 μm, and a weight per unit area of the gas diffusion layer 100 may be less than or equal to about 2 mg/cm$^2$, for example, from about 0.1 mg/cm$^2$ to about 1.5 mg/cm$^2$. Also, porosity of the gas diffusion layer 100 may be equal to or greater than about 70 vol % or about 80 vol %, and electrical conductivity of the gas diffusion layer 100 may be equal to or greater than 200 S/m.

Moreover, as is further described above, the gas diffusion layer 100 according to an embodiment may include the porous layer 110 functioning as a support and having a porous structure formed by a combination of the non-conductive fiber structure 111, and accordingly, the metal-air battery 1 may have reduced weight and improved mechanical strength. Also, the gas diffusion layer 100 according to an embodiment may include the conductive carbon layer 120 having suitable electrical conductivity and disposed on the surface of the non-conductive fiber structure 111 included in the porous layer 110. Therefore, conditions regarding high specific capacity of positive-electrode and excellent electrical conductivity may be satisfied.

Also, as illustrated in FIGS. 2D and 2E, a metal layer 140 according to an embodiment may be disposed along a surface of the conductive carbon layer 120. For example, a metallic material included in the metal layer 140 may be included in the conductive carbon layer 120 and may improve the electrical conductivity of the gas diffusion layer 100. For example, the metal layer 140 may include Au, Pt, Ag, Ni, Al, Fe, Ti, Cu, or a combination thereof.

In addition, as illustrated in FIGS. 2F and 2G, a conductive polymer layer 150 according to an embodiment may be disposed along the surface of the conductive carbon layer 120. For example, a conductive polymer material included in the conductive polymer layer 150 may be included in the conductive carbon layer 120 and may improve the electrical conductivity of the gas diffusion layer 100. Also, the conductive polymer layer 150 may be relatively lighter than the metal layer 140 and thus may reduce the weight of the gas diffusion layer 100. For example, the conductive polymer layer 150 may include polypyrrole (PPy), polythiophene (PT), polyaniline (PAN), or a combination thereof.

Figure 3A:
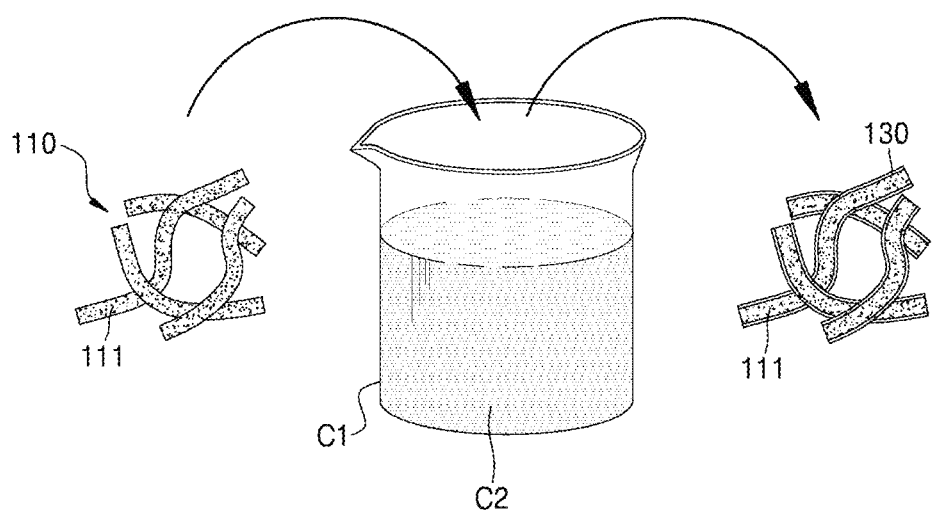
FIGS. 3A and 3B illustrate an embodiment of a method of manufacturing a gas diffusion layer by a layer-by-layer method.
Figure 3B:
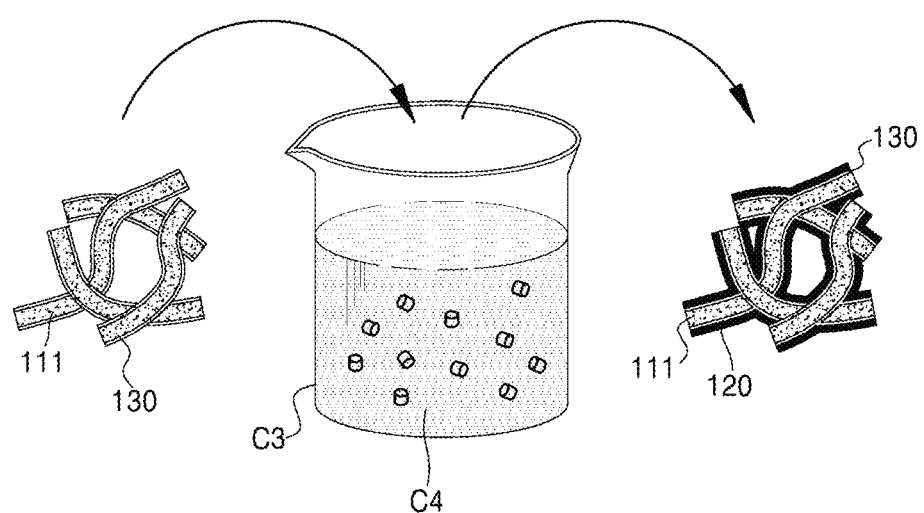

FIGS. 3A and 3B are diagrams for explaining a method of manufacturing the gas diffusion layer by using a layer-by-layer method, according to an embodiment.

Referring to FIG. 3A, an adhesive layer 130 may be on the surface of the non-conductive fiber structure 111 within a container C1. For example, an adhesive solution C2 prepared by dissolving an adhesive in a solution may be within the container C1, and the adhesive layer 130 may be attached to the surface of the non-conductive fiber structure 111 by adding the non-conductive fiber structure 111 to the adhesive solution C2. For example, the adhesive may be PVA, poly(vinylpyrrolidone) (PVP), polyaniline (PANI), poly(diallyldimethylammonium chloride (PDDA), poly(ethylene oxide) (PEO), poly(ethylene imine) (PEI), poly(allylamine hydrochloride) (PAH), poly(acrylic acid), sulfonated tetrafluoroethylene based fluoropolymer-copolymer such as tetrafluoroethylene-perfluoro-3,6-dioxa-4-methyl-7-octenesulfonic acid copolymer (Nafion®), or a combination thereof. For example, when the non-conductive fiber structure 111 is added to the adhesive solution C2 in which PVA dissolves, the adhesive layer 130 may be formed on the surface of the non-conductive fiber structure 111 through a noncovalent bond between the non-conductive fiber structure 111 and PVA that is an adhesive.

Referring to FIG. 3B, within a container C3, the conductive carbon layer 120 may be disposed on a surface of the adhesive layer 130 that is attached to the surface of the non-conductive fiber structure 111. For example, a dispersing solution C4 may be prepared by dispersing a carbon material in a solution within the container C3. For example, the dispersing solution C4, which is prepared by dispersing the carbon material in the solution, may be prepared by using the above-described dispersant or performing the sonication process. For example, when PSS is used as a dispersant, the conductive carbon layer 120 may be attached to the surface of the adhesive layer 130 due to a hydrogen bond between a sulfonic group ($—SO_3H$) of PSS and a hydroxyl group (—OH) of PVA.

Referring to FIGS. 3A and 3B, in order to sequentially combine two ultra-thin films on the surface of the non-conductive fiber structure 111, that is, the adhesive layer 130 and the conductive carbon layer 120, with each other, a bonding method such as a noncovalent bond or a hydrogen bond between the adhesive layer 130 and the non-conductive fiber structure 111 and between the adhesive layer 130 and the conductive carbon layer 120 is used, and the bonding method may be referred to as a layer-by-layer method. Since the bonds between the adhesive layer 130 and the non-conductive fiber structure 111 and between the adhesive layer 130 and the conductive carbon layer 120 are structurally stable due to the layer-by-layer method, the gas diffusion layer 100 may be provided as a stable multilayered ultra thin film, regardless of a surface area of where the adhesive layer 130 is attached to the surface of the non-conductive fiber structure 111 and a surface area of where the conductive carbon layer 120 is attached to the surface of the adhesive layer 130. Therefore, when the layer-by-layer method is used, the gas diffusion layer 100, in which the surface of the non-conductive fiber structure 111 is coated with the conductive carbon layer 120, may be more easily manufactured. However, the present disclosure is not limited to the above manufacturing method. The gas diffusion layer 100, in which the surface of the non-conductive fiber structure 111 is coated with the conductive carbon layer 120, may be manufactured by using another suitable manufacturing method.

Figure 4A:
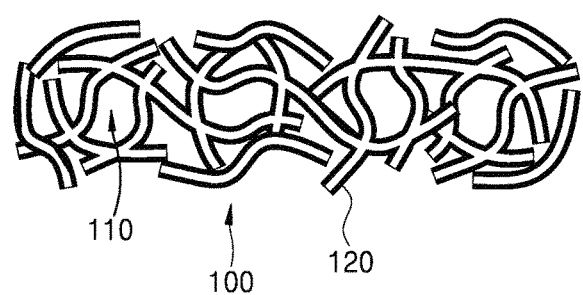
FIG. 4A is a schematic perspective view of a gas diffusion layer manufactured by using a layer-by-layer method.
Figure 4B:
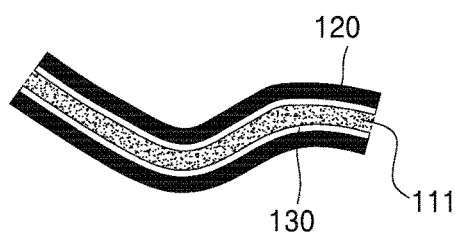
FIG. 4B shows a schematic enlarged view of the gas diffusion layer of FIG. 4A.
Figure 5A:
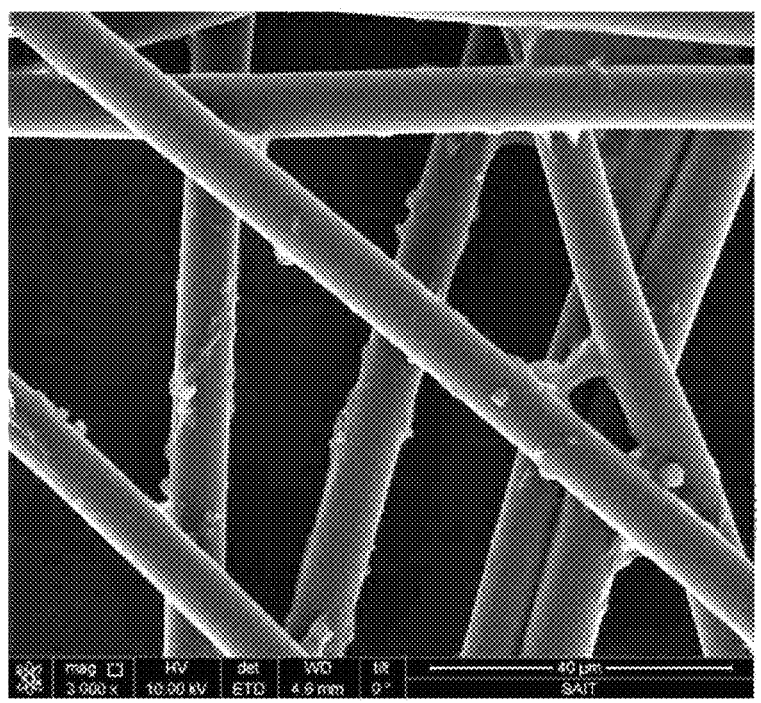
FIG. 5A is a SEM image showing a fine structure of a gas diffusion layer manufactured by using a layer-by-layer method.
Figure 5B:
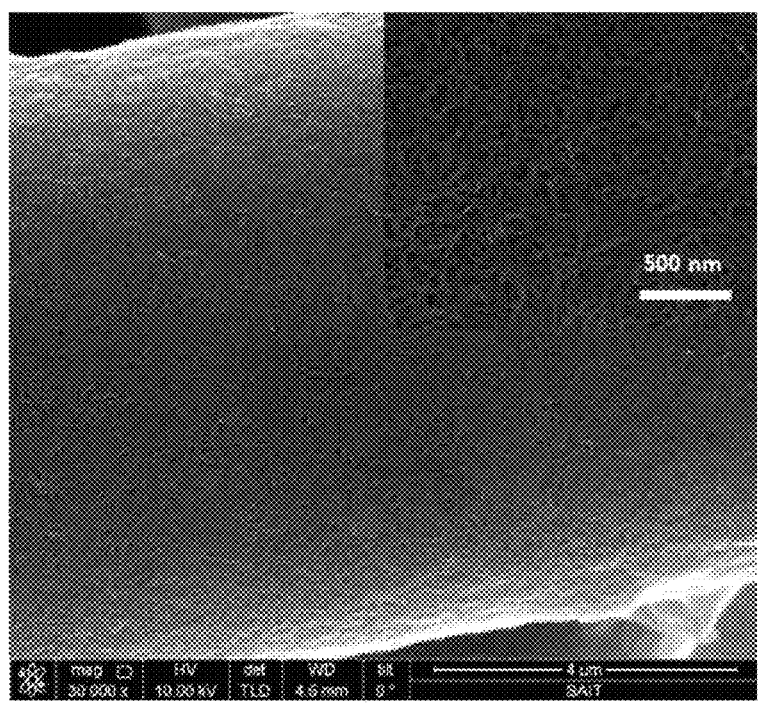
FIG. 5B is an enlarged image of the gas diffusion layer of FIG. 5A.
Figure 6:
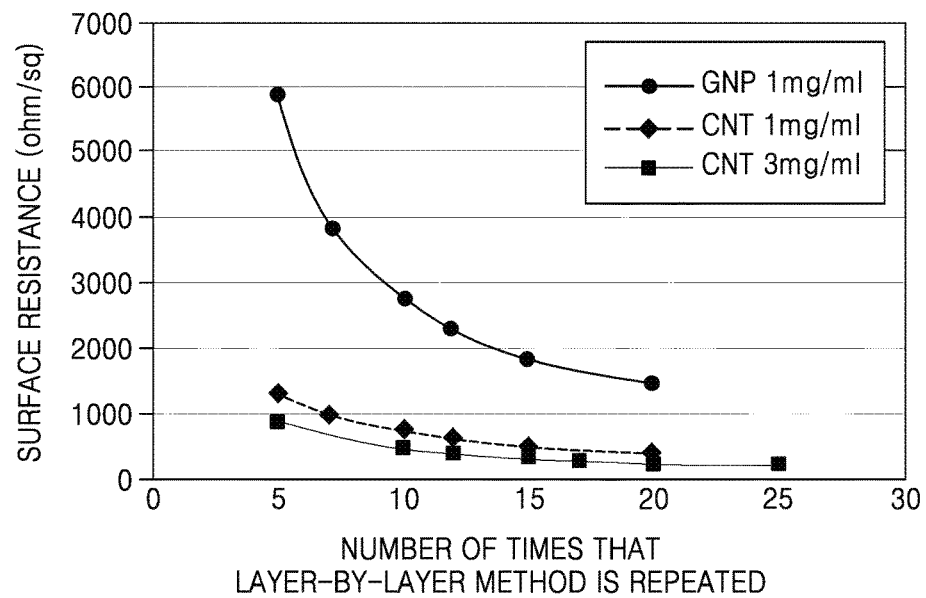
FIG. 6 is a graph of a number of times that a layer-by-layer method is repeated versus surface resistance (ohms per square) illustrating a relationship between the number of repetitions and surface resistance of a gas diffusion layer that is manufactured by repeatedly performing a layer-by-layer method.
Figure 7:
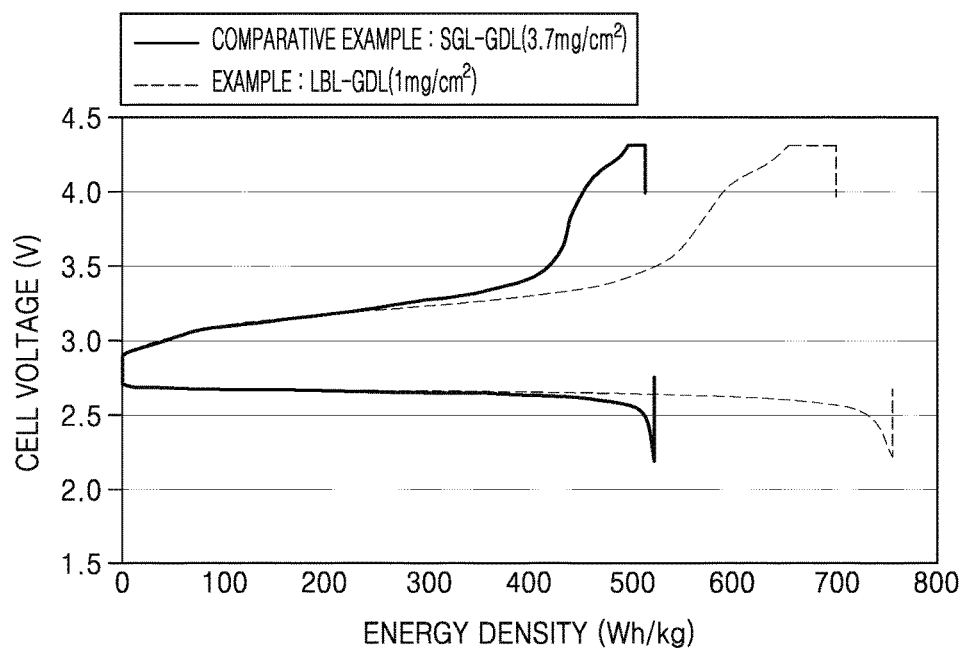
FIG. 7 is a graph of energy density (Watt hours per kilogram, Wh/kg) versus cell voltage (Volts) illustrating a result of measuring an energy density and a cell voltage that are obtained during a discharge process.

FIG. 4A is a schematic perspective view of a gas diffusion layer manufactured by using a layer-by-layer method. FIG. 4B shows a schematic enlarged view of the gas diffusion layer of FIG. 4A. FIG. 5A is a SEM image showing a fine structure of the gas diffusion layer manufactured by using the layer-by-layer method. FIG. 5B is an enlarged image of the gas diffusion layer of FIG. 5A. FIG. 6 is a graph of a number of times that the layer-by-layer method is repeated versus surface resistance (ohms per square) illustrating a relationship between the number of repetitions and surface resistance of a gas diffusion layer that is manufactured by repeatedly performing a layer-by-layer method. FIG. 7 is a graph of energy density (Watt hours per kilogram, Wh/kg) versus cell voltage (Volts) illustrating a result of measuring an energy density and a cell voltage that are obtained during a discharge process.

Referring to FIGS. 4A, 4B, 5A, and 5B, the gas diffusion layer 100 manufactured by performing the layer-by-layer method may include: the porous layer 110 including pores through which air may diffuse; the conductive carbon layer 120 including a carbon material, e.g., a CNT, which is attached to the surface of the non-conductive fiber structure 111 included in the porous layer 110; and the adhesive layer 130 that is disposed between non-conductive fiber structure 111 and the conductive carbon layer 120 and attaches the conductive carbon layer 120 to the surface of the non-conductive fiber structure 111. The structures of the porous layer 110, the conductive carbon layer 120, and the adhesive layer 130, the bond between the non-conductive fiber structure 111 and the adhesive layer 130, and the bond between the adhesive layer 130 and the conductive carbon layer 120 have been already described above, and thus the descriptions thereof will not be repeated for clarity of explanation.

According to an embodiment, a process of forming the adhesive layer 130 and the conductive carbon layer 120 may be repeatedly performed by using the layer-by-layer method. Accordingly, multiple adhesive layers 130 and multiple conductive carbon layers 120 may be alternately arranged. Referring to FIG. 6, a graphene nano plate (GNP) and CNTs are used as a carbon material included in the conductive carbon layer 120, wherein the amount of the GNP is 1 milligram per milliliter (mg/mL) and the amounts the CNT are 1 mg/mL and 3 mg/mL, respectively. When the layer-by-layer method is repeated 5 to 20 times, measured surface resistance of the gas diffusion layer 100 may change. When the conductive carbon layer 120 is formed by repeatedly performing the layer-by-layer method regardless of types and contents of the carbon materials, it is found that an electrical characteristic, e.g., the surface resistance, is reduced. Therefore, the number of times that the layer-by-layer method is repeated to form the conductive carbon layer 120 may be determined according to mechanical and electrical characteristics of the gas diffusion layer 100.

Hereinafter, the present disclosure will be further described by explaining the following examples, but is not limited thereto.

EXAMPLES (Manufacture of a Gas Diffusion Layer)

Example and Comparative Example: Manufacture of a Lithium Air Battery

Example 1

For carbon coating, an aqueous dispersion of a CNT of 3 mg/mL (CM-250, Hanwha Chemical) was prepared. For effective dispersion, poly(4-styrenesulfonic acid) (Aldrich, Mw=75,000 Daltons, Da) was added as a dispersant to the aqueous dispersion such that a weight ratio of carbon to the dispersant was 1:5. A 0.25 weight percent (wt %) PVA (Mw=89,000 Da) solution was used as a polymer in an adhesive layer.

A gas diffusion layer coated with carbon was manufactured by using a layer-by-layer method. A PET non-woven fabric (05TH-08, HIROSE) was immersed in the PVA solution and then cleansed with distilled water and dried. Then, the PET non-woven fabric was immersed in a carbon dispersion and cleansed with distilled water and dried to thereby manufacture one carbon coating layer. The above-described processes were repeatedly performed several times to manufacture a gas diffusion layer having a suitable electrical conductivity.

Comparative Example

Industrial carbon paper (Sigracet 25BA, SGL Group) was used as a gas diffusion layer.
(Manufacture of Positive Electrode)
A CNT (NC2100, Nanocyl) as a positive catalyst, 1-ethyl-3-methylimidazolium bis(trifluoromethylsulfonyl)imide (Aldrich), to which 0.5 M of lithium bis(trifluoromethylsulphonyl)imide is added, as a positive electrode electrolyte, and polytetrafluoroethylene (PTFE, DAIKIN) as a binder were mixed with each other at a weight ratio of 1:2:0.2 in order to manufacture a positive electrode.
(Manufacture of Electrolyte Membrane)
N-butyl-N-methylpyrrolidinium bis(trifluoromethanesulfonyl)imide (KANTO), poly(diallyldimethylammonium bis(trifluoromethanesulfonyl)imide), and lithium bis(trifluoromethylsulphonyl)imide were mixed at a weight ratio of 75:17.6:7.4 and diluted with acetonitrile to obtain a solution. A polyethylene (PE) separator (Entek EPX) was impregnated with the solution, and then is dried, thereby manufacturing the electrolyte membrane.
(Manufacture of a Lithium-Air Battery)
The electrolyte membrane, the positive electrode, and the gas diffusion layer were sequentially stacked on a Li foil negative electrode so as to manufacture the lithium-air battery.
Evaluation Example: Evaluation on Discharge Characteristics and Energy Density
At a temperature of 80° C., under oxygen atmosphere, the lithium-air battery was fully discharged and then was charged to a current density of about 0.24 milliamperes per square centimeter ($mA/cm^2$). A discharge capacity (mAh) and cell voltage (V) obtained during the above process were measured, and results thereof are shown in FIG. 7. Based on evaluation results of the discharge characteristics, energy densities in the Example and Comparative Example may be evaluated.

TABLE 1

|  | Comparative Example (SGL-GDL) | Example (LBL-GDL) |
| --- | --- | --- |
| Negative electrode ($mg/cm^2$, under the assumption that it is 3 times higher than discharge capacity) | 1.78 | 2.05 |
| Electrolyte membrane ($mg/cm^2$) | 3.6 | 3.6 |
| Positive electrode ($mg/cm^2$) | 2.5 | 2.5 |
| Gas diffusion layer ($mg/cm^2$) | 3.7 | 1.0 |
| Cell capacity ($mAh/cm^2$) | 2.29 | 2.64 |
| Average discharge voltage (V) | 2.64 | 2.63 |
| Cell energy density (Wh/kg) | 522 | 757 |

Referring to Table 1, it is found that the lithium air battery manufactured in the Example 1 had an improved energy density compared to the lithium air battery manufactured in the Comparative Example.

Example 2

The carbon coating layer manufactured by using the layer-by-layer method in the Example 1 was additionally coated with PPy to manufacture a gas diffusion layer. A non-woven fabric coated with the conductive carbon layer, which was manufactured by the layer-by-layer method, was immersed in a 5 wt % PPy solution (Aldrich, 482552) and then dipped after 10 minutes and dried to thereby manufacture a gas diffusion layer including a conductive polymer layer.

Example 3

The carbon coating layer manufactured by using the layer-by-layer method in the Example 1 was additionally coated with Au to manufacture a gas diffusion layer. A non-woven fabric coated with the conductive carbon layer, which was manufactured by using the layer-by-layer method, was coated with Au by using a sputtering method to thereby manufacture a gas diffusion layer including a metal layer.

TABLE 2

|  | Example 1 | Example 2 | Example 3 |
| --- | --- | --- | --- |
| Weight ($mg/cm^2$) | 1 | 1 | 1.3 |
| Surface resistance (ohm/sq) | 270 | 190 | 170 |

Referring to Table 2, it is found that the lithium air batteries manufactured in the Example 2 and Example 3 had lower surface resistance than the lithium air battery manufactured in Example 1.

According to an embodiment of the present disclosure, a metal-air battery having a high capacity and a high energy density may be provided. A metal-air battery having a composite laminate structure, e.g., a 3D folding cell, may be provided. A metal-air battery capable of maintaining electrical conductivity and porosity and achieving mechanical strength and a light weight may be provided.

It should be understood that embodiments described herein should be considered in a descriptive sense only and not for purposes of limitation. Descriptions of features, aspects, or advantages within each embodiment should be considered as available for other similar features, aspects, or advantages in other embodiments.

While one or more embodiments have been described with reference to the figures, it will be understood by those of ordinary skill in the art that various changes in form and details may be made therein without departing from the spirit and scope as defined by the following claims.

What is claimed is:
1. A gas diffusion layer for a metal-air battery, the gas diffusion layer comprising:
a porous layer comprising
a plurality of non-conductive fiber structures; and
a plurality of adhesive layers and a plurality of conductive carbon layers, wherein each of the plurality of adhesive layers and each of the plurality of conductive carbon layers is disposed on a surface of each non-conductive fiber structure of the plurality of non-conductive fiber structures,
wherein each conductive carbon layer of the plurality of conductive carbon layers comprises a carbon material, wherein an adhesive layer of the plurality of adhesive layers is disposed on the surface of each non-conductive fiber structure and a conductive carbon layer of the plurality of conductive carbon layers is disposed directly on a surface of the adhesive layer, and wherein the adhesive layer bonds the conductive carbon layer to the surface of each non-conductive fiber structure, wherein a thickness of the conductive carbon layer is equal to or greater than about 1% and less than or equal to about 10% of an average thickness of the non-conductive fiber structure and wherein the plurality of adhesive layers and the plurality of conductive carbon layers are alternately disposed 5 to 20 times on the surface of each non-conductive fiber structure, and the gas diffusion layer has a resistivity of less than 6,000 ohms per square.

2. The gas diffusion layer of claim 1, wherein a non-conductive fiber structure of the plurality of non-conductive fiber structures has a shape comprising a curvilinear shape, a rectilinear shape, or a combination thereof, and wherein an air gap is defined by the shape of the plurality of non-conductive fiber structures.

3. The gas diffusion layer of claim 1, wherein a non-conductive fiber structure of the plurality of non-conductive fiber structures comprises a polymer fiber, cellulose, a glass fiber, or a combination thereof.

4. The gas diffusion layer of claim 1, wherein the porous layer is in a form of a woven fabric, a non-woven fabric, a mesh, or a combination thereof comprising the plurality of non-conductive fiber structures.

5. The gas diffusion layer of claim 1, wherein the carbon material comprises a carbon fiber, a carbon nanotube, a carbon-polymer complex, or graphene nano plate (GNP).

6. The gas diffusion layer of claim 1, wherein the carbon material comprised in the conductive carbon layer is uniformly disposed along a surface of a non-conductive fiber structure of the plurality of non-conductive fiber structures.

7. The gas diffusion layer of claim 6, wherein the conductive carbon layer further comprises a dispersant configured to disperse the carbon material.

8. The gas diffusion layer of claim 7, wherein the dispersant comprises polystyrene sulfonate, poly(4-styrenesulfonic acid), polyvinyl pyrrolidone, polyethylene glycol oleyl ether, polyoxyethylene stearyl ether, polyoxyethylene nonylphenyl ether, poly(ethylene glycol)-block-poly(propylene glycol)-block-poly(ethylene glycol), poly(propylene glycol)-block-poly(ethylene glycol)-block-poly(propylene glycol), polyethylene-block-poly(ethylene glycol), polyoxyethylene isooctylcyclohexyl ether, octylphenol ethoxylate, cetylpyridinium chloride, cetyltrimethylammonium bromide, cetyltrimethylammonium chloride, or a combination thereof.

9. The gas diffusion layer of claim 1, further comprising a metal layer disposed along a surface of the conductive carbon layer.

10. The gas diffusion layer of claim 1, further comprising a conductive polymer layer disposed along a surface of the conductive carbon layer.

11. The gas diffusion layer of claim 1, wherein the adhesive layer comprises polyvinyl alcohol, polyvinylpyrrolidone, polyaniline, poly(diallyldimethylammonium chloride), poly(ethylene oxide), poly(ethylene imine), poly(allylamine hydrochloride), poly(acrylic acid), tetrafluoroethylene-perfluoro-3,6-dioxa-4-methyl-7-octenesulfonic acid copolymer, or a combination thereof.

12. The gas diffusion layer of claim 5, wherein the carbon material comprises a carbon nanotube or a graphene nano plate.

13. A method of manufacturing the gas diffusion layer for a metal-air battery of claim 1, the method comprising:
disposing an adhesive layer on the surface of each non-conductive fiber structure of the plurality of non-conductive fiber structures; and
contacting the adhesive layer with the carbon material to form the conductive carbon layer comprising the carbon material on the surface of each non-conductive fiber structure to manufacture the gas diffusion layer.

14. The method of claim 13, further comprising combining the carbon material, a dispersant, and a solvent to uniformly disperse the carbon material.

15. The method of claim 13, wherein the adhesive layer comprises polyvinyl alcohol, poly(vinylpyrrolidone), polyaniline, poly(diallyldimethylammonium chloride), poly(ethylene oxide), poly(ethylene imine), poly(allylamine hydrochloride), poly(acrylic acid), tetrafluoroethylene-perfluoro-3,6-dioxa-4-methyl-7-octenesulfonic acid copolymer, or a combination thereof.

16. The method of claim 14, wherein the dispersant comprises polystyrene sulfonate, poly(4-styrenesulfonic acid), polyvinylpyrrolidone, polyethylene glycol oleyl ether, polyoxyethylene stearyl ether, polyoxyethylene nonylphenyl ether, poly(ethylene glycol)-block-poly(propylene glycol)-block-poly(ethylene glycol), poly(ethylene glycol)-block-poly(propylene glycol)-block-poly(ethylene glycol), poly(propylene glycol)-block-poly(ethylene glycol)-block-poly(propylene glycol), polyethylene-block-poly(ethylene glycol), polyoxyethylene isooctylcyclohexyl ether, octylphenol ethoxylate, cetylpyridinium chloride, cetyltrimethylammonium bromide, cetyltrimethylammonium chloride, or a combination thereof.

17. The method of claim 13, wherein the disposing of the adhesive layer and the contacting of adhesive layer with the carbon material are repeatedly performed to provide plurality of adhesive layers and a plurality of conductive carbon layers that are alternately arranged.

18. A metal-air battery comprising:
a negative electrode comprising a metal;
a positive electrode comprising a positive electrode layer comprising a catalyst and a gas diffusion layer for the metal-air battery; and
an electrolyte between the negative electrode and the positive electrode,
wherein the gas diffusion layer comprises:
a porous layer comprising
a plurality of non-conductive fiber structures; and
a plurality of adhesive layers a plurality of conductive carbon layers, wherein each of the plurality of adhesive layers and each of the plurality of conductive carbon layers is disposed directly on a surface of each non-conductive fiber structure of the plurality of non-conductive fiber structures; and
a plurality of conductive carbon layers,
wherein each of the plurality of conductive carbon layers comprises a carbon material, and
wherein an adhesive layer of the plurality of adhesive layers is disposed on the surface of each non-conductive fiber structure and a conductive carbon layer of the plurality of conductive carbon layers is disposed on the adhesive layer,
wherein the adhesive layer bonds the conductive carbon layer to the surface of each non-conductive fiber structure, wherein a thickness of the conductive carbon layer is equal to or greater than about 1% and less than or equal to about 10% of an average thickness of the non-conductive fiber structure and wherein the plurality of adhesive layers and the plurality of conductive carbon layers are alternately disposed 5 to 20 times on the surface of each non-conductive fiber structure, and the gas diffusion layer has a resistivity of less than 6,000 ohms per square.

19. The metal-air battery of claim 18, wherein porosity of the gas diffusion layer is equal to or greater than about 70 vol %.

20. The metal-air battery of claim 18, wherein a weight per unit area of the gas diffusion layer is less than or equal to about 2 mg/cm$^2$.

21. The metal-air battery of claim 18, wherein electrical conductivity of the gas diffusion layer is equal to or greater than about 200 S/m.

22. The metal-air battery of claim 18, wherein the conductive carbon layer comprises a conformal layer along a contour of the non-conductive fiber structure.

* * * * *